United States Patent
Eom et al.

(10) Patent No.: US 12,028,627 B2
(45) Date of Patent: Jul. 2, 2024

(54) IMAGE SENSOR AND METHOD OF OPERATING THE SAME WITH RESETTING OF A DUMMY RESET ARRAY AND READING OF A DUMMY READ ARRAY

(71) Applicant: SAMSUNG ELECTRONICS CO., LTD., Suwon-si (KR)

(72) Inventors: Jaeha Eom, Suwon-si (KR); Mooyoung Kim, Suwon-si (KR); Kwanghyun Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 235 days.

(21) Appl. No.: 17/573,297

(22) Filed: Jan. 11, 2022

(65) Prior Publication Data

US 2022/0132057 A1 Apr. 28, 2022

Related U.S. Application Data

(63) Continuation of application No. 16/938,419, filed on Jul. 24, 2020, now Pat. No. 11,265,488.

(30) Foreign Application Priority Data

Jul. 25, 2019 (KR) ........................ 10-2019-0090486

(51) Int. Cl.
*H04N 25/533* (2023.01)
*G01J 1/42* (2006.01)
(Continued)

(52) U.S. Cl.
CPC .............. *H04N 25/533* (2023.01); *G01J 1/42* (2013.01); *H04N 25/75* (2023.01); *H04N 25/766* (2023.01)

(58) Field of Classification Search
CPC .... H04N 5/3535; H04N 5/3741; H04N 5/378; H04N 25/533; H04N 25/75; H04N 25/766; G01J 1/42
See application file for complete search history.

(56) References Cited

U.S. PATENT DOCUMENTS 6,344,877 B1  2/2002  Gowda et al.
6,801,256 B1  10/2004  Egawa et al.
(Continued)

FOREIGN PATENT DOCUMENTS

JP   2004-112474 A   4/2004
JP   2007318581 A   12/2007
(Continued)

OTHER PUBLICATIONS

Communication issued Feb. 8, 2024 by the Korean Intellectual Property Office in Korean Patent Application No. 10-2019-0090486.

*Primary Examiner* — Nicholas G Giles
(74) *Attorney, Agent, or Firm* — Sughrue Mion, PLLC

(57) ABSTRACT

An image sensor includes an active pixel array, at least one dummy reset array, a dummy read array, and an image processor. The image processor sequentially resets respective rows of pixels included in the at least one dummy reset array in a period in which pixels of the active pixel array do not perform a reset operation, and sequentially reads respective rows of pixels included in the dummy read array in a period in which the pixels of the active pixel array do not perform a read operation.

20 Claims, 12 Drawing Sheets

(51) Int. Cl.
  *H04N 25/75*   (2023.01)
  *H04N 25/766*  (2023.01)

(56) References Cited

U.S. PATENT DOCUMENTS

| | | |
|---|---|---|
| 7,489,353 B2 | 2/2009 | Funakoshi |
| 8,629,923 B2 | 1/2014 | Ebihara |
| 9,025,056 B2 | 5/2015 | Ebihara |
| 9,432,602 B2 | 8/2016 | Takatsuka et al. |
| 9,560,295 B2 | 1/2017 | Mabuchi |
| 9,769,402 B2 | 9/2017 | Koh et al. |
| 10,652,483 B2 | 5/2020 | Nikai |
| 10,914,849 B2 | 2/2021 | Ofuji et al. |
| 2004/0233310 A1 | 11/2004 | Egawa et al. |
| 2009/0009643 A1 | 1/2009 | Muroshima et al. |
| 2011/0102622 A1 | 5/2011 | Ebihara |
| 2015/0034803 A1* | 2/2015 | Koh ...................... H04N 25/63 250/208.1 |
| 2016/0134823 A1 | 5/2016 | Mabuchi |
| 2019/0028661 A1 | 1/2019 | Nikai |
| 2019/0146103 A1 | 5/2019 | Ofuji et al. |
| 2020/0221043 A1* | 7/2020 | Sato ...................... H04N 25/581 |

FOREIGN PATENT DOCUMENTS

| | | |
|---|---|---|
| JP | 2011-97540 A | 5/2011 |
| KR | 10-2005-0093677 A | 9/2005 |
| KR | 101176789 B1 | 8/2012 |

\* cited by examiner

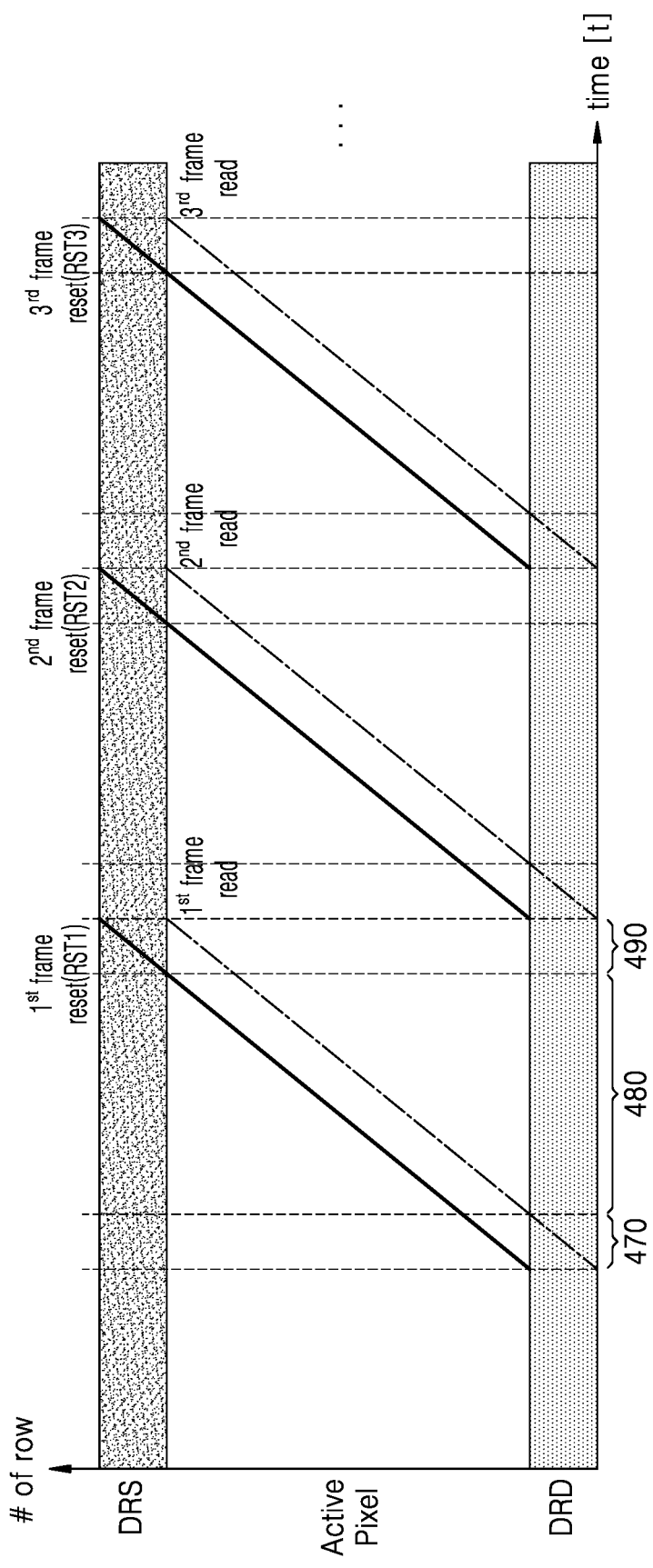

IMAGE SENSOR AND METHOD OF OPERATING THE SAME WITH RESETTING OF A DUMMY RESET ARRAY AND READING OF A DUMMY READ ARRAY

CROSS-REFERENCE TO THE RELATED APPLICATION

This application is a continuation application of U.S. application Ser. No. 16/938,419 filed Jul. 24, 2020, which claims priority from Korean Patent Application No. 10-2019-0090486, filed on Jul. 25, 2019, in the Korean Intellectual Property Office, the disclosure of which is incorporated herein in its entirety by reference.

BACKGROUND

One or more example embodiments relate to an image sensor, and more particularly, to an image sensor including a dummy pixel that performs a rolling shutter operation, and a method of operating the same.

An electronic device having a function of capturing an image such as a digital camera or a smartphone may include an image sensor. The image sensor as a semiconductor device for converting optical information into an electrical signal may be, for example, a charge-coupled device (CCD) or a complementary metal oxide semiconductor (CMOS).

The image sensor includes a plurality of pixels including a photoelectric conversion element and a plurality of transistors. A signal on which photoelectric conversion is performed by the photoelectric conversion element is processed by the plurality of transistors and is output, and image data may be generated based on signals output from the plurality of pixels. Each of the plurality of pixels may perform photoelectric conversion on light of a particular color or wavelength and may output a signal in accordance with the photoelectric conversion.

SUMMARY

One or more example embodiments provide an image sensor capable of removing band noise generated by a coupling coefficient that varies in each row of an active pixel array when a rolling shutter operation is performed and improving image quality.

According to an aspect of an example embodiment of the disclosure, there is provided an image sensor, including an active pixel array, at least one dummy reset array, a dummy read array, and an image processor. The image processor is configured to sequentially reset respective rows of pixels included in the at least one dummy reset array in a period in which pixels of the active pixel array do not perform a reset operation, and sequentially read respective rows of pixels included in the dummy read array in a period in which the pixels of the active pixel array do not perform a read operation.

According to an aspect of an example embodiment of the disclosure, there is provided a method of operating an image sensor including a pixel image including a plurality of shared pixels. The method includes sequentially resetting respective rows of pixels included in the at least one dummy reset array in a period in which pixels of the active pixel array do not perform a reset operation; and sequentially reading respective rows of pixels included in the dummy read array in a period in which the pixels of the active pixel array do not perform a read operation.

According to an aspect of an example embodiment of the disclosure, there is provided a method of operating an image sensor including a pixel image including a plurality of shared pixels. The method includes sequentially performing a reset operation and a read operation in respective rows of the active pixel array; sequentially performing the read operation in respective rows of the dummy read array in a period in which the active pixel array does not perform the read operation; and sequentially performing the reset operation in respective rows of the at least one dummy reset array in a period in which the active pixel array does not perform the reset operation.

BRIEF DESCRIPTION OF THE DRAWINGS

The above and other aspects and features of the disclosure will become more apparent by describing in detail example embodiments thereof with reference to the attached drawings, in which:

FIG. 4C illustrates another example of the arrangement of a pixel array including a dummy read array and a dummy reset array according to an example embodiment of the disclosure;

DETAILED DESCRIPTION

Hereinafter, example embodiments of the disclosure will be described in detail with reference to the accompanying drawings.

Figure 1:
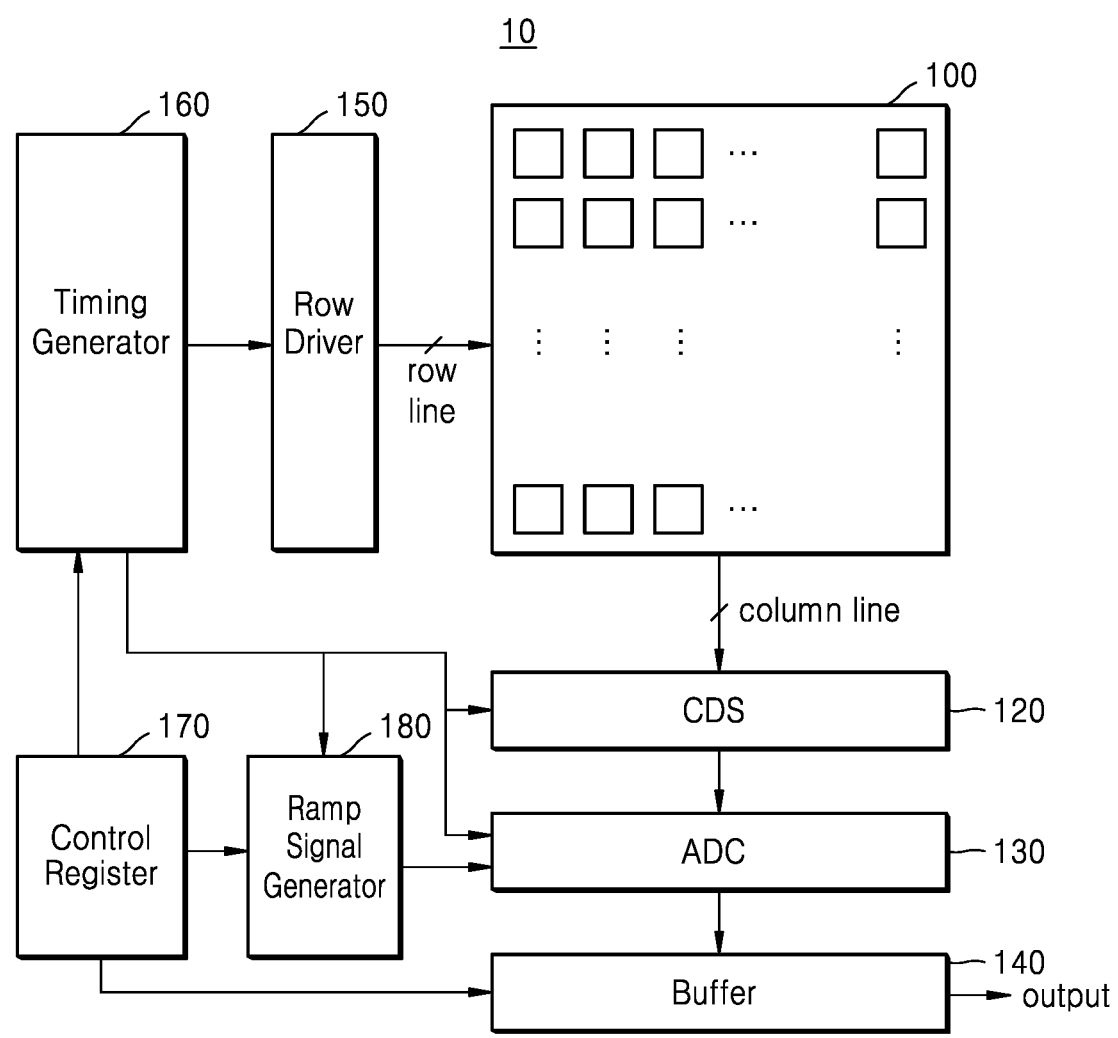
FIG. 1 is a block diagram of an image sensor according to example embodiments of the disclosure.

FIG. 1 is a block diagram of an image sensor 10 according to example embodiments of the disclosure.

Referring to FIG. 1, the image sensor 10 may include a pixel array 100 in which a plurality of pixels are arranged in a matrix, a correlated double sampling (CDS) 120, an analog-digital converter (ADC) 130, a buffer 140, a row driver 150, a timing generator 160, a control register 170, and a ramp signal generator 180.

The timing generator 160 may generate one or more control signals for controlling operations of the CDS 120, the ADC 130, the row driver 150, and the ramp signal generator 180. The control register 170 may generate one or more control signals for controlling operations of the buffer 140, the timing generator 160, and the ramp signal generator 180.

The row driver 150 may drive the pixel array 100 in units of row lines. For example, the row driver 150 may generate a selection signal capable of selecting one row line from among a plurality of row lines. Each of the plurality of pixels may sense incident light and may output an image reset signal and an image signal to the CDS 120 through a column line. The CDS 120 may perform sampling on the received image reset signal and image signal.

The ADC 130 may output a comparison signal by comparing a ramp signal output from the ramp signal generator 180 with a sampling signal output from the CDS 120. Level transition time of the comparison signal may be counted in accordance with a clock signal provided from the timing generator 160, and a count value may be output to the buffer 140. The ramp signal generator 180 may operate in accordance with control of the timing generator 160.

Referring to FIG. 1, it is illustrated that the CDS 120 and the ADC 130 receive one column line signal output from the pixel array 100. However, the disclosure is not limited thereto. In an example embodiment, the image sensor 10 may include two CDSs and two ADCs. In this case, in the pixel array 100, a column line signal of a first area (for example, upper pixels of half of the pixel array 100) may be transmitted to a first CDS and a first ADC. In the pixel array 100, column line signals of a second area (for example, lower pixels of half of the pixel array 100) excluding the first area may be transmitted to a second CDS and a second ADC.

The buffer 140 may store a plurality of digital signals output from the ADC 130 and may sense, amplify, and output the plurality of digital signals. Therefore, the buffer 140 may include memory (not shown) and a sensing amplifier (not shown). The memory (not shown) is configured to store the count value, and the count value is related to a signal output from the plurality of pixels. The sensing amplifier (not shown) may sense and amplify the count value output from the memory (not shown).

Figure 2A:
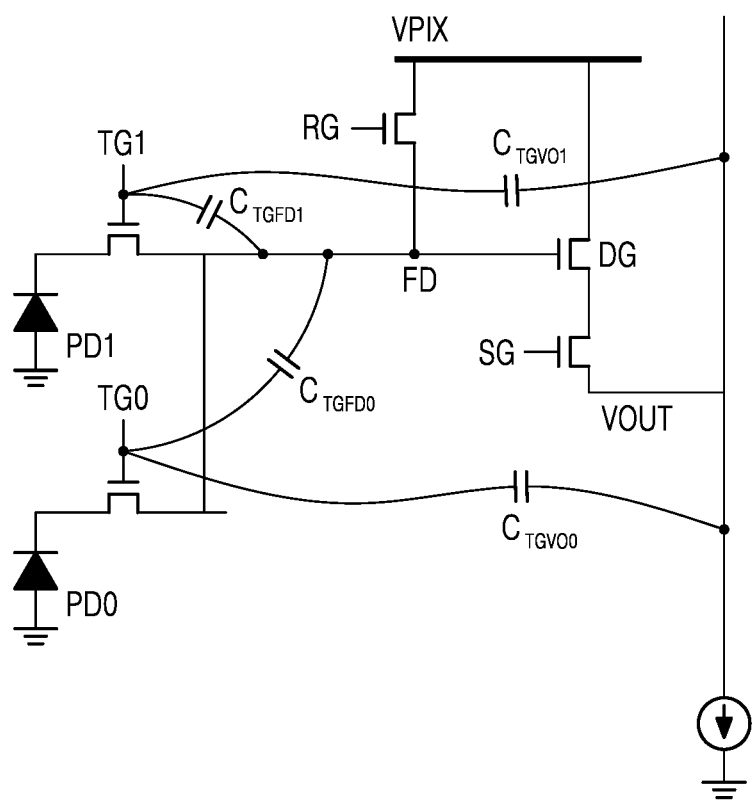
FIG. 2A illustrates an example in which different coupling coefficients are caused between rows of two pixels that share a floating diffusion (FD) node.
Figure 2B:
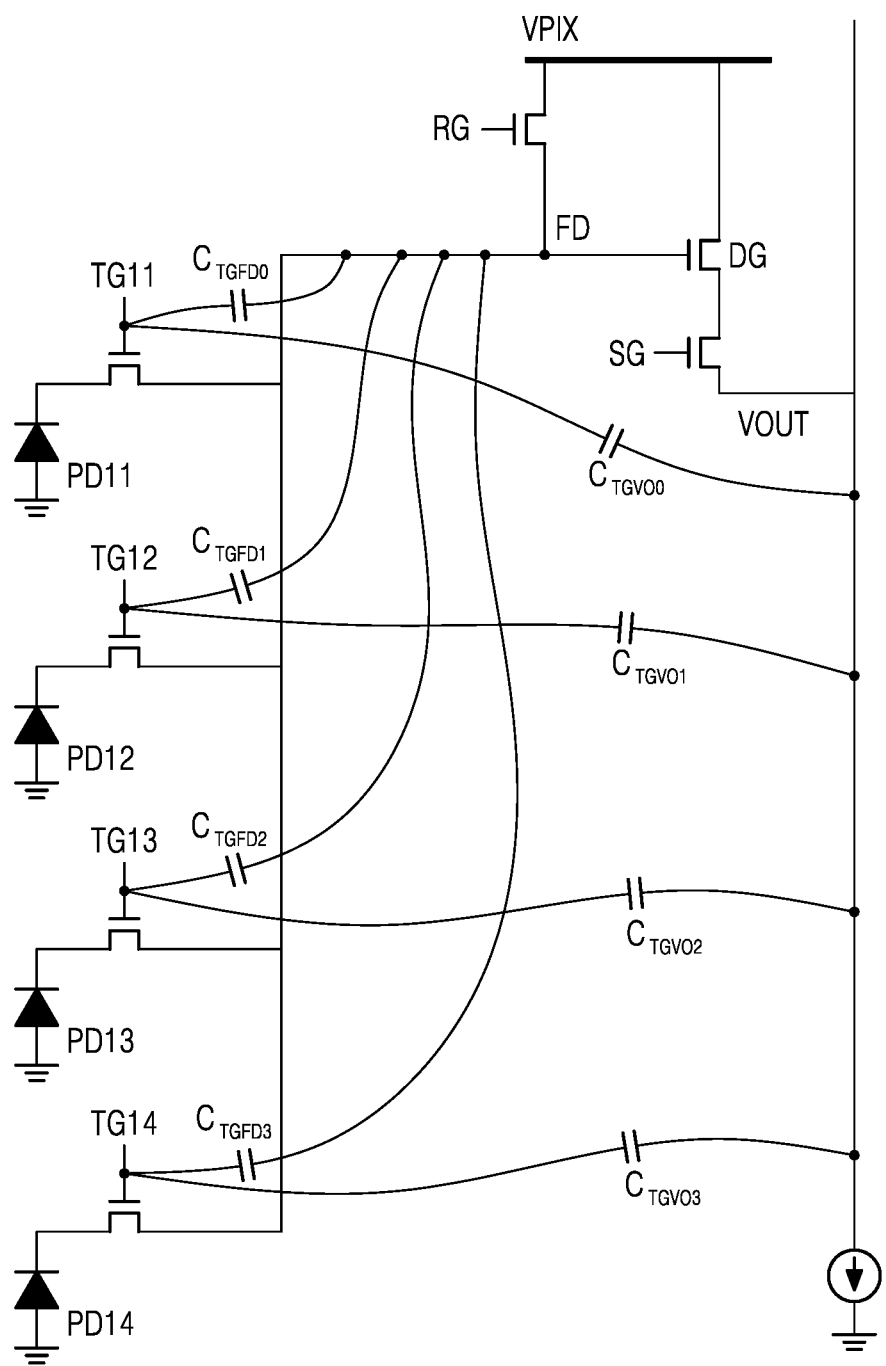
FIG. 2B illustrates another example in which different coupling coefficients are caused between rows of four pixels that share an FD node.
Figure 2C:
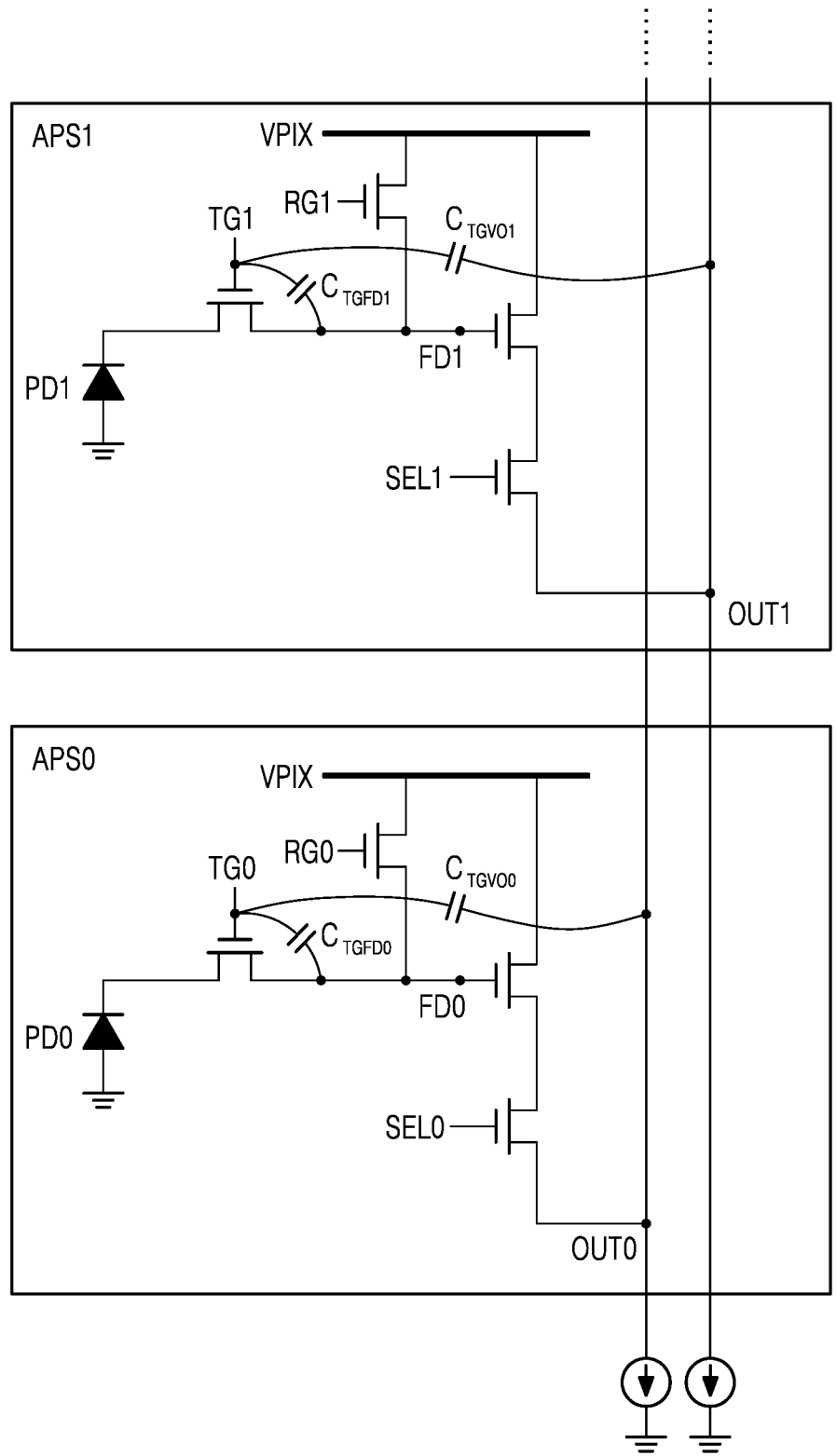
FIG. 2C illustrates another example in which different coupling coefficients are caused between rows of pixels that are respectively connected to different output lines.

FIG. 2A is an example embodiment of a circuit diagram of a shared pixel in which two pixels share a floating diffusion (FD) node, FIG. 2B is an example embodiment of a circuit diagram of a shared pixel in which four pixels share an FD node, and FIG. 2C is an example embodiment of a circuit diagram of pixels connected to different output column lines.

According to example embodiments, FIGS. 2A to 2C illustrate examples in which a coupling coefficient varies in each row of the pixel array 100. The coupling coefficient may refer to a parasitic capacitance generated between a transmission transistor and an FD node and/or a column output line of each of the plurality of pixels.

Referring to FIG. 2A, the shared pixel may include two pixels. In detail, the shared pixel may include a plurality of photo-sensing devices PD0 and PD1, a plurality of transmission transistors, including a first transmission transistor TG0 and a second transmission transistor TG1, a selection transistor SG, a driving transistor DG, and a reset transistor RG.

Referring to FIG. 2B, the shared pixel may include four pixels. In detail, the shared pixel may include a plurality of photo-sensing devices PD11, PD12, PD13, and PD14, a plurality of transmission transistors, including a first transmission transistor TG11, a second transmission transistor TG12, a third transmission transistor TG13, and a fourth transmission transistor TG14, a selection transistor SG, a driving transistor DG, and a reset transistor RG.

Each of the photo-sensing devices may generate a photo-charge in accordance with the intensity of the incident light. For example, each of the photo-sensing devices may be a P-N conjunction diode and may generate charges, that is, electrons that are negative charges and holes that are positive charges, in proportion to the amount of received light. Each of the photo-sensing devices may correspond to a photoelectric conversion element, examples of which include, but not limited to, at least one of a photo transistor, a photo gate, a pinned photo diode (PPD), and any combination among the photo transistor, the photo gate, and the PPD. Each of the transmission transistors TG11, TG12, TG13, and TG14 may be activated and may transmit the photo-charges respectively generated by the photo-sensing devices to the FD node. The driving transistor DG may correspond to a buffer amplifier. The driving transistor DG may be referred to as a source follower (SF). Since a gate terminal of the driving transistor DG is connected to the FD node, a voltage of the FD node may correspond to a gate voltage of the driving transistor DG. That is, the driving transistor DG may output a pixel signal VOUT by amplifying a gate voltage value changed in accordance with the photo-charge transmitted to the FD node. A drain terminal of the selection transistor SG is connected to a source terminal of the driving transistor DG. The selection transistor SG may output the pixel signal VOUT to the CDS (for example, 120 of FIG. 1) through the column output line. The reset transistor RG may be activated in response to a reset signal and may change a voltage of the FD node into a reset voltage in response to the reset transistor RG being activated.

According to example embodiments, the shared pixels may have various parasitic capacitances. Referring to FIG. 2A, the shared pixel may be coupled between the FD node and gate terminals of the first and the second transmission transistors TG0 and TG1 that are connected to the FD node and may have capacitances $C_{TGFD0}$ and $C_{TGFD1}$. In addition, the shared pixel may be coupled between gate terminals of the first and the second transmission transistors TG0 and TG1 and an output column line and may have parasitic capacitances $C_{TGVO0}$ and $C_{TGVO1}$. The plurality of mutual capacitances may vary in each row. For example, the parasitic capacitances $C_{TGFD1}$ and $C_{TGVO1}$ coupled with the second transmission transistor TG1 are significantly affected by a power voltage VPIX line adjacent to the second transmission transistor TG1 or a ground GND line (not shown) so that the parasitic capacitances may vary. On the other hand, since the parasitic capacitances $C_{TGFD0}$ and $C_{TGVO0}$ coupled with the first transmission transistor TG0 may be positioned away from the power voltage VPIX line or the ground GND line (not shown) than the second transmission transistor TG1, the parasitic capacitances $C_{TGFD0}$ and $C_{TGVO0}$ may not be significantly affected by the power voltage VPLX line or the ground GND line. Therefore, in the shared pixel in which the FD node is shared, the plurality of parasitic capacitances may vary and have different capacitance values.

According to example embodiments, referring to FIG. 2B, parasitic capacitances $C_{TGFD0}$, $C_{TGFD1}$, $C_{TGFD2}$, and $C_{TGFD3}$ may be provided between the four transmission transistors TG11 to TG14 and the FD node. The first to the fourth transmission transistors TG11 to TG14 may form the same column. The first to the fourth transmission transistors TG11 to TG14 may respectively correspond to different rows. As described above, the first to the fourth transmission transistors TG11 to TG14 corresponding to different rows may have different coupling coefficients. In addition, different parasitic capacitances $C_{TGVO0}$, $C_{TGVO1}$, $C_{TGVO2}$, and $C_{TGVO3}$ may be provided between the first to the fourth transmission transistors TG11 to TG14 and the output column line.

According to example embodiments, referring to FIG. 2C, a first pixel APS0 and a second pixel APS1 may be respectively connected to different column output lines. For example, the first pixel APS0 may output an image signal through the first column output line VOUT0 and the second pixel APS1 may output an image signal through the second column output line VOUT1. In this case, a value of the parasitic capacitance $C_{TGVO0}$ generated between the transmission transistor TG0 of the first pixel APS0 and the first column output line VOUT0 may be different from a value of the parasitic capacitance $C_{TGVO1}$ generated between the second transmission transistor TG1 of the second pixel APS1 and the second column output line VOUT1. It is because the first column output line VOUT0 and the second column output line VOUT1 are physically different wiring lines, and thus a distance by which the transmission transistor TG0 is spaced apart from the first column output line VOUT0 may be different from a distance by which the transmission transistor TG1 is spaced apart from the second column output line VOUT1.

Referring to FIGS. 2A and 2B, it is illustrated that, in the shared pixel, two or four pixels share the FD node. However, the disclosure is not limited thereto and a number of pixels other than two or four pixels may be included in the shared pixel. For example, in the shared pixel, eight or sixteen pixels may share one FD node. The number of pixels included in the shared pixel may vary in accordance with example embodiments in consideration of a proper balance to be maintained among an obtainable area gain, a reduced read speed, and increase in complexity of a control signal according to an increase of the number of pixels that share the FD node. In addition, in the above-described example embodiments, it is illustrated that coupling coefficients of the shared pixel that share the FD node or pixels connected to different column output lines may be different from each other. However, the disclosure is not limited thereto. For example, the pixel array according to example embodiments of the disclosure may have an asymmetrical pixel array structure in which a coupling coefficient varies in each row and/or column.

Figure 3:
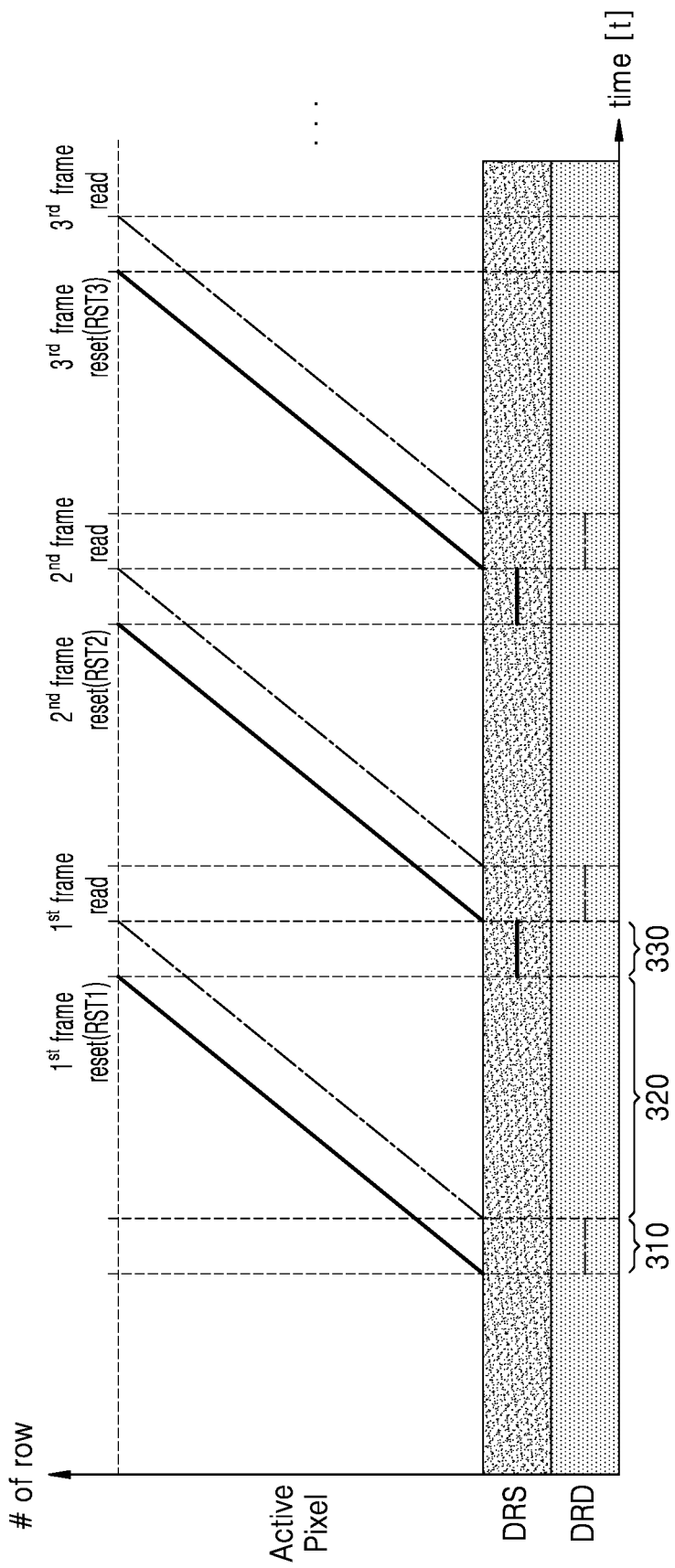
FIG. 3 is a view illustrating a problem that occurs when a dummy pixel array operates in a fixed row.

FIG. 3 is a view illustrating a problem that occurs when a dummy pixel array operates in a fixed row.

Hereinafter, for the sake of convenience of explanation, a period in which an active pixel array sequentially performs only a reset operation in a row and does not perform a read operation may be referred to as a read blank period. In addition, a period in which the active pixel array sequentially performs only the read operation in the row and does not perform the reset operation may be referred to as a reset blank period. It is assumed that the active pixel array includes a plurality of rows from an m-th row to a p-th row (m and p being integer greater than one).

Referring to FIG. 3, in a period 310, the active pixel array may sequentially perform the reset operation from the m-th row. That is, the period 310 may correspond to the read blank period. At a final point in time of the period 310, the active pixel array may complete a reset operation to a (k−1)-th row (k being an integer greater than m).

In a period 320, the active pixel array may sequentially perform the reset operation from a k-th row, and may sequentially perform the read operation from the m-th row in which the reset operation is completed. The read operation from the m-th row and the reset operation from the k-th row may be performed at the same time. That is, in the period 320, the active pixel array may simultaneously perform the read operation and the reset operation on different rows. At a final point in time of the period 320, the active pixel array may complete the reset operation to the p-th row. Since the read operation is performed after the period 310, the active pixel array may sequentially complete the read operation to a (l−1)-th row (l being an integer greater than k).

In a period 330, the active pixel array may sequentially perform the read operation from an l-th row to the p-th row. Since the reset operation is completed on the active pixel array in the previous period, that is, the period 320, the period 330 may correspond to the reset blank period.

According to example embodiments, in the period 320, the same coupling coefficient may be repeated between a row in which the read operation is performed and a row in which the reset operation is performed. For example, when the second transmission transistor TG1 is activated in order to read the m-th row at a starting point in time of the period 320, noise based on a second coupling coefficient corresponding to the second transmission transistor TG1 may be caused. When the second transmission transistor TG1 is activated in order to reset the k-th row at the starting point in time of the period 320, noise based on the second coupling coefficient corresponding to the second transmission transistor TG1 may be caused. Subsequently, during the period 320, whenever the reset operation or the read operation is performed, an activated transmission transistor by the reset operation and an activated transmission transistor by the read operation are the same such that a repetition between the first transmission transistor TG0 and the second transmission transistor TG1 occurs. Since an activated transmission transistor is switched repeatedly between the second transmission transistor TG1 and the first transmission transistor TG0, the coupling coefficient may also be repeated between the second coupling coefficient corresponding to the second transmission transistor TG1 and a first coupling coefficient corresponding to the first transmission transistor TG0.

In another example, at the starting point in time of the period 320, the first transmission transistor TG0 is activated in order to read the m-th row and the second transmission transistor TG1 may be activated in order to reset the k-th row. In this case, the coupling coefficient caused during the read operation may be the first coupling coefficient based on the first transmission transistor TG0 and the coupling coefficient caused during the reset operation may be the second coupling coefficient based on the second transmission transistor TG1. Since the transmission transistors are sequentially activated in each row in the period 320, image quality in the period 320 may be uniform. That is, while the read and reset operations are sequentially performed in each row, the coupling coefficient caused by the read operations in the rows may correspond to the same coupling coefficient (in this example, the first coupling coefficient), and the coupling coefficient caused by the reset operations in the rows may correspond to the same coupling coefficient (in this example, the second coupling coefficient). Therefore, while the image signal output in the period 320 may include noise based on the uniform coupling coefficient, the image signal with uniform quality may be output in the period 320.

Image quality in the period 310 or 330 may be different from the image quality in the period 320. In detail, it is assumed that at a starting point in time of the period 310, the active pixel array activates the first transmission transistor TG0 and a dummy read array DRD activates the first transmission transistor TG0. While the m-th row is reset, the active pixel array may be affected by the first coupling coefficient based on the first transmission transistor TG0 and the dummy read array may also be affected by the first coupling coefficient based on the first transmission transistor TG0. Subsequently, the active pixel array may activate the second transmission transistor TG1 in order to reset an (m+1)-th row that is a next row. Therefore, when the (m+1)-th row is reset, in the active pixel array, noise is generated in accordance with the second coupling coefficient based on the second transmission transistor TG1. On the other hand, since the dummy read array toggles the first transmission transistor TG0 in a fixed row, the first transmission transistor TG0 may also be activated at a point in time at which the (m+1)-th row is reset. Therefore, in the (m+1)-th row, noise is generated in the active pixel array in accordance with the second coupling coefficient and different noise is generated in the dummy read array in accordance with the first coupling coefficient. Thus, quality of an entire image repeatedly deteriorates in each row and accordingly, quality of the image signal output in the period 310 or 330 may not be uniform.

Figure 4A:
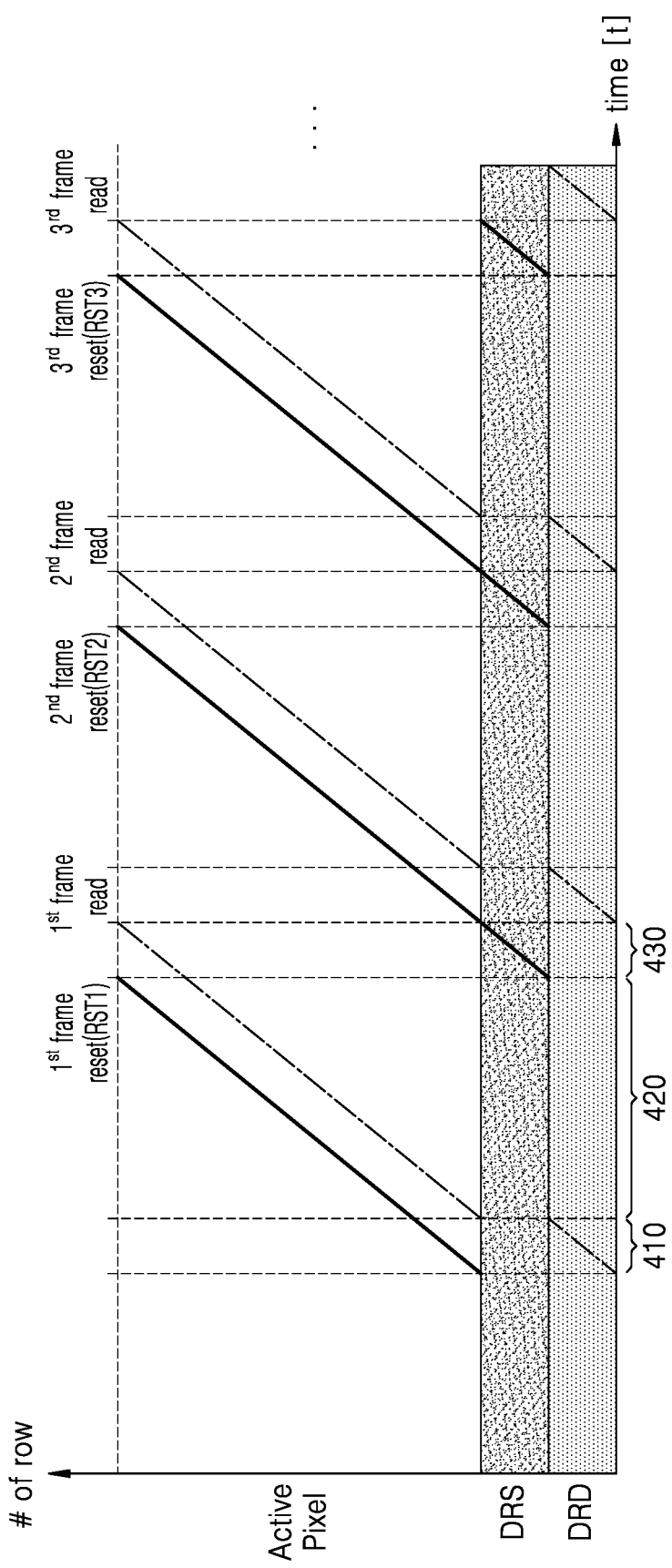
FIG. 4A illustrates an example of an arrangement of a pixel array including a dummy read array and a dummy reset array according to an example embodiment of the disclosure.
Figure 4B:
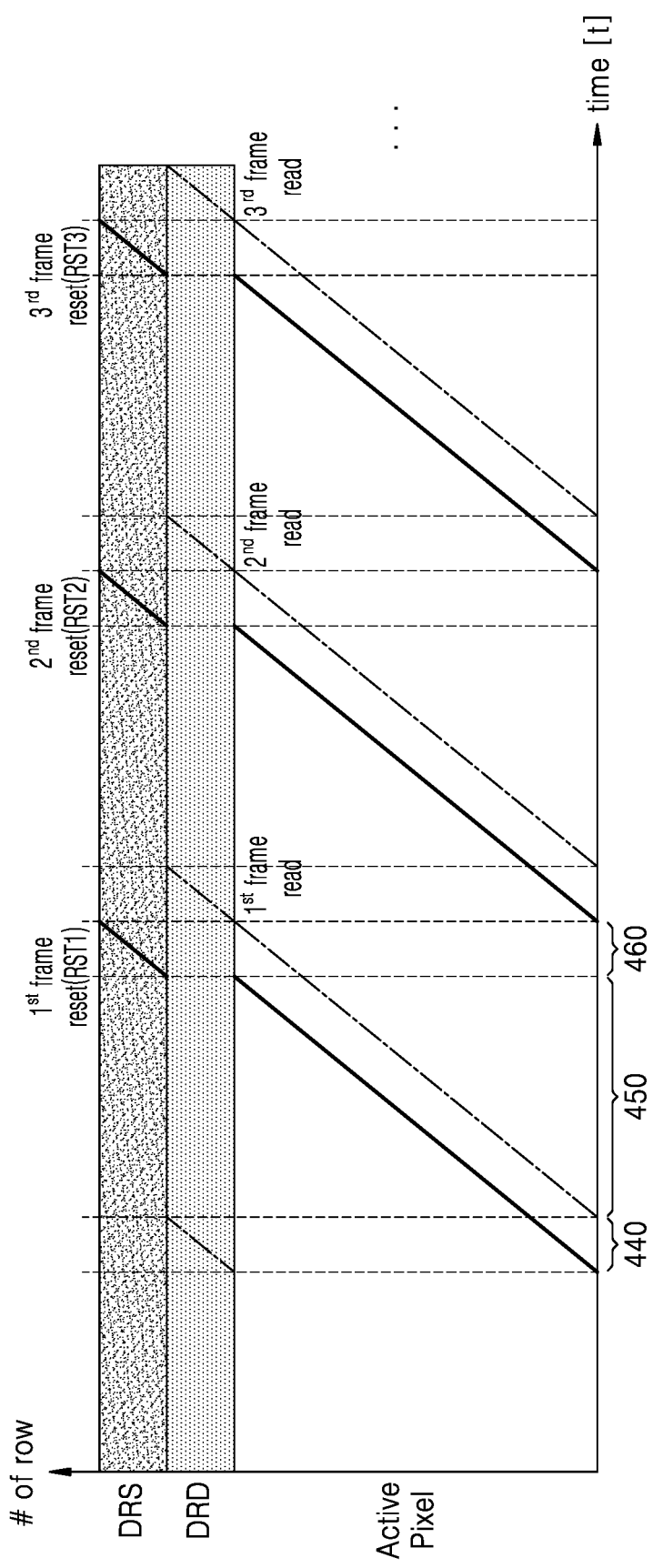
FIG. 4B illustrates another example of an arrangement of a pixel array including a dummy read array and a dummy reset array according to an example embodiment of the disclosure.

FIG. 4A illustrates an example of the arrangement of a pixel array including a dummy read array and a dummy reset array according to an example embodiment of the disclosure. FIG. 4B illustrates another example of the arrangement of a pixel array including a dummy read array and a dummy reset array according to an example embodiment of the disclosure. FIG. 4C illustrates another example of the arrangement of a pixel array including a dummy read array and a dummy reset array according to an example embodiment of the disclosure. Repetitive description previously made with reference to FIG. 3 will be omitted.

Referring to FIG. 4A, in a period 410, the active pixel array may sequentially perform the reset operation from the m-th row. It may be assumed that the active pixel array activates the first transmission transistor TG0 in the m-th row. According to example embodiments, the dummy read array DRD may sequentially perform the read operation from a first row. While the dummy read array of FIG. 3 performs the read operation in the fixed row, the dummy read array of FIG. 4A may sequentially perform the read operation from the first row to an n-th row. For example, it may be assumed that the dummy read array activates the first transmission transistor TG0 in the first row. Subsequently, both the dummy read array and the active pixel array may sequentially toggle the second transmission transistor TG1 and the first transmission transistor TG0. That is, the active pixel array activates the second transmission transistor TG1 in the (m+1)-th row, and the dummy read array may activate the second transmission transistor TG1 in a second row. Next, the active pixel array activates the first transmission transistor TG0 in the (m+2)-th row, and the dummy read array may activate the first transmission transistor TG0 in a third row. Therefore, although the dummy read array and the active pixel array sequentially perform the read operation and the reset operation in each row, respectively, noise based on the same coupling coefficient may be generated. Therefore, image quality may not fluctuate in each row.

In another example, it may be assumed that the active pixel array activates the first transmission transistor TG0 in the m-th row, and the dummy read array activates the second transmission transistor TG1 in the first row. Therefore, in the active pixel array, noise of the first coupling coefficient in accordance with the first transmission transistor TG0 may be generated and, in the dummy read array, noise of the second coupling coefficient in accordance with the second transmission transistor TG1 may be generated. Although the dummy read array and the active pixel array respectively have the second coupling coefficient and the first coupling coefficient different from each other, since the dummy read array and the active pixel array toggle the first transmission transistor TG0 and the second transmission transistor TG1 in a next row, respectively, the noise of the first coupling coefficient in accordance with the first transmission transistor TG0 may be generated in the dummy read array and the noise of the second coupling coefficient in accordance with the second transmission transistor TG1 may be generated in the active pixel array. That is, since the coupling coefficients of the dummy read array and the active pixel array have a consistent difference value between the first coupling coefficient and the second coupling coefficient in the period 410, it is possible to prevent the image quality from fluctuating in each row in the period 410 and to provide uniform image quality in the period 410.

In a period 420, the active pixel array may sequentially perform the reset operation from the k-th row and may sequentially perform the read operation from the m-th row, which is similar to an operation performed in the period 320 of FIG. 3. Repetitive description will be omitted.

In a period 430, the active pixel array may sequentially perform the read operation from the l-th row. It may be assumed that the active pixel array activates the first transmission transistor TG0 in the l-th row. The dummy reset array DRS may sequentially perform the reset operation from the n-th row. It may be assumed that the dummy reset array activates the first transmission transistor TG0 in the n-th row. Subsequently, both the dummy reset array and the active pixel array may sequentially toggle the second transmission transistor TG1 and the first transmission transistor TG0. That is, the active pixel array activates the second transmission transistor TG1 in the (l+1)-th row, and the dummy reset array may activate the second transmission transistor TG1 in a (n+1)-th row. Next, the active pixel array activates the first transmission transistor TG0 in the (l+2)-th row, and the dummy reset array may activate the first transmission transistor TG0 in a (n+2)-th row. Therefore, although both the dummy reset array and the active pixel array sequentially perform the reset operation and the read operation in each row, respectively, noise based on the same difference in coupling coefficient may be generated. Therefore, the image quality may not fluctuate in each row.

In another example, it may be assumed that the active pixel array may sequentially perform the read operation from the l-th row, and the dummy reset array activates the second transmission transistor TG1 in the n-th row. Therefore, in the active pixel array, the noise of the first coupling coefficient in accordance with the first transmission transistor TG0 may be generated and, in the dummy reset array, the noise of the second coupling coefficient in accordance with the second transmission transistor TG1 may be generated. Although the coupling coefficients of the dummy reset array and the active pixel array are different from each other, since the dummy reset array and the active pixel array toggle the first transmission transistor TG0 and the second transmission transistor TG1 in a next row, respectively, the noise of the first coupling coefficient in accordance with the first transmission transistor TG0 may be generated in the dummy reset array and the noise of the second coupling coefficient in accordance with the second transmission transistor TG1 may be generated in the active pixel array. That is, since the coupling coefficients of the dummy reset array and the active pixel array have a consistent difference value between the first coupling coefficient and the second coupling coefficient in the period 430, it is possible to prevent the image quality from fluctuating in each row in the period 430. Accordingly, uniform image quality may be provided in the period 430.

Referring to FIGS. 4B and 4C, arrangements of the dummy reset array and the dummy read array may change according to example embodiments. In an example embodiment of FIG. 4B, the active pixel array may be arranged on a lower portion of the pixel array 100 and start an operation from the first row, and the dummy read array and the dummy reset array may be arranged on an upper portion of the pixel array 100. Operations in periods 440, 450, and 460 in FIG. 4B may respectively correspond to operations in the periods 410, 420, and 430 described in FIG. 4A, and thus, repetitive description will be omitted.

Referring to FIGS. 4A and 4B, in the periods 410 and 440 or the periods 430 and 460, image quality does not deteriorate in each row. Initial image quality may vary based on a physical distance between an activated row of the active pixel array and an activated row of the dummy read array or dummy reset array. For example, at the starting point in time of the period 410, the m-th row is activated in the active pixel array and the first row is activated in the dummy read array. Accordingly, a physical distance between the activated rows in the active pixel array and the dummy read array may correspond to m number of rows. On the other hand, at the starting point in time of the period 440, since the first row is activated in the active pixel array and an i-th row is activated in the dummy read array are activated, a physical distance between the activated rows may correspond to i number of rows. Therefore, the initial image quality may be higher in a case where a signal is processed between activated rows closer to each other in the period 410 than in a case where a signal is processed between activated rows spaced apart from each other in the period 440.

In an example embodiment of FIG. 4C, the dummy read array may be arranged on a lower portion of the pixel array 100 while the dummy reset array may be arranged on an upper portion of the pixel array 100. Operations in periods 470, 480, and 490 in FIG. 4C may respectively correspond to operations in the periods 410, 420, and 430 described in FIG. 4A, and thus, repetitive description will be omitted.

According to an example embodiment, when the dummy reset array is arranged on an upper area of the pixel array 100 and the dummy read array is arranged on a lower area of the pixel array 100 as shown in FIG. 4C, the initial image quality may be higher than the example embodiments of FIGS. 4B and 4C. However, the disclosure is not limited thereto. A method of arranging the dummy arrays on the pixel array 100 may vary in accordance with various factors such as integration time (a time difference between the reset operation and the read operation) and a frame length.

Figure 5A:
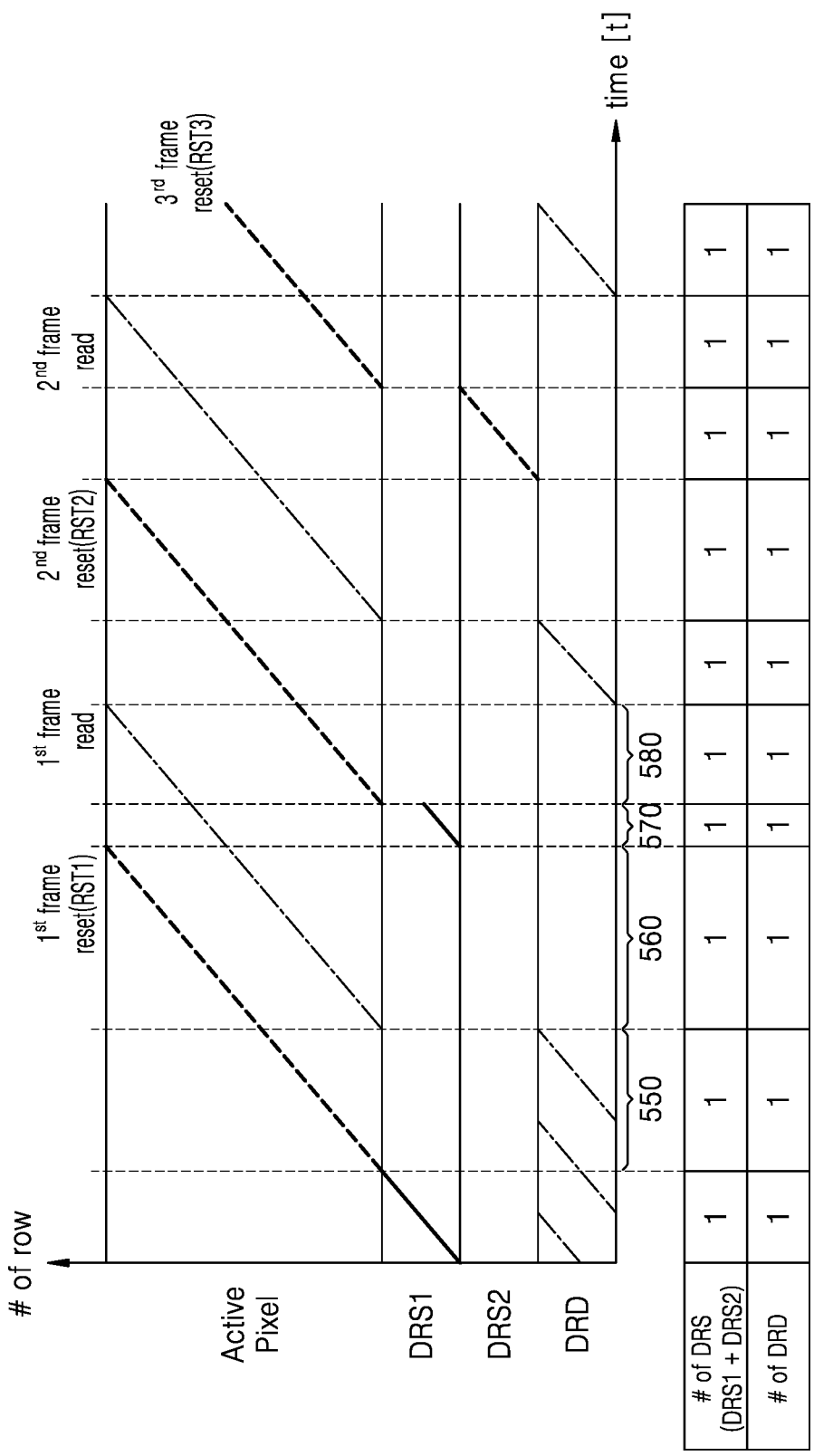
FIG. 5A illustrates an example of a case in which two dummy reset arrays are used according to an example embodiment of the disclosure.

FIG. 5A illustrates an example of a case in which a plurality of dummy reset arrays are used according to an example embodiment of the disclosure.

According to example embodiments, in the active pixel array, integration time in a first frame may be set to be different from that in a second frame. For example, referring to FIG. 5A, the integration time in the first frame may correspond to a time period between a point in time at which a reset operation of the first frame starts and a point in time at which a read operation of the first frame starts, and the integration time in the second frame may correspond to a time period between a point in time at which a reset operation of the second frame starts and a point in time at which a read operation of the second frame starts. A length of the integration time in the first frame may be less than that of the integration time in the second frame. For example, when an electronic device including the image sensor 10 is located in a bright place when the first frame is processed and moved to a dark place when the second frame is processed, the control register 170 of the image sensor 10 as shown in FIG. 1 may generate a control signal instructing the integration time to be set to be longer in the second frame than that in the first frame. Since a point in time at which the active pixel array sequentially performs the read operation is fixed, in order to provide a longer integration time in the second frame, the active pixel array may perform the reset operation earlier than the reset operation performed in the first frame based on the control signal.

Referring to FIG. 5A, a dummy array may include a plurality of dummy reset arrays. When the dummy array includes the plurality of dummy reset arrays, the number of dummy reset arrays may correspond to n times of a number of a row in which a coupling coefficient is repeated. For example, when the coupling coefficient (e.g., the first coupling coefficient of the first transmission transistor TG0 or the second coupling coefficient of the second transmission transistor TG1 as in the example embodiment of FIG. 2A) is repeated in every two rows in the active pixel array, the number of dummy reset arrays may correspond to 2×n=2n. In another example, when the coupling coefficient (e.g., any one of the first coupling coefficient of the first transmission transistor TG11 to the fourth coupling coefficient of the fourth transmission transistor TG14 as in the example embodiment of FIG. 2B) is repeated in every four rows in the active pixel array, the number of dummy reset arrays may correspond to 4×n=4n. Hereinafter, for the sake of convenience of explanation, description will be made based on an example embodiment in which two coupling coefficients are repeated in every two rows, and the dummy array includes two dummy reset arrays DRS1 and DRS2.

In a period 510, the active pixel array may sequentially perform the reset operation in each row of the active pixel array. Since the active pixel array simultaneously perform the reset operation and the read operation in a period 520, in order to make image quality in the period 510 and image quality in the period 520 uniform, in the period 510, the dummy read array may sequentially perform the read operation in each row of the dummy read array.

In the period 520, the active pixel array may sequentially perform the read operation and the reset operation in respective rows, which is similar to an operation performed in the period 420 of FIG. 4. Repetitive description will be omitted.

In a period 530, the active pixel array may sequentially perform only the read operation in each row of the active pixel array. That is, at a time point after the period 530 is started, the reset operation for the first frame is completed for all the rows of the active pixel array, but the read operation may not be completed for all the rows of the active pixel array. Since the read operation and the reset operation are simultaneously performed in the period 520, in order to generate the same image quality as that of the period 520, one of the dummy reset arrays may sequentially perform the reset operation in each row. For example, a first dummy reset array DRS1 of the dummy reset arrays may be activated while the active pixel array performs the read operation for remaining rows of the first frame. While the active pixel array sequentially performs the read operation in the period 530, the first dummy reset array DRS1 sequentially performs the reset operation and accordingly, image quality may be the same as that of the neighboring period, that is, the period 520. A fixed row is not activated in the first dummy reset array and each row is sequentially activated and accordingly, the image quality may also be uniform in the period 530.

In a period 540, the active pixel array may simultaneously perform the read operation and the reset operation. When the integration time is set to be longer in the second frame than the first frame, the reset operation for the second frame may be performed in advance by a set time than in the first frame. Therefore, a time interval in which the reset operation for the second frame is performed may overlap a time interval in which the read operation for the first frame is performed. Since the periods 510, 520, and 530 in which an image of the first frame is generated are based on noise caused by simultaneously performing one reset operation and one read operation, the period 540 may also be based on noise caused by simultaneously performing one read operation the one reset operation. That is, in the period 540, since the active pixel array may simultaneously perform the read operation and the reset operation, the dummy reset arrays and the dummy read array may not be activated.

Figure 5B:
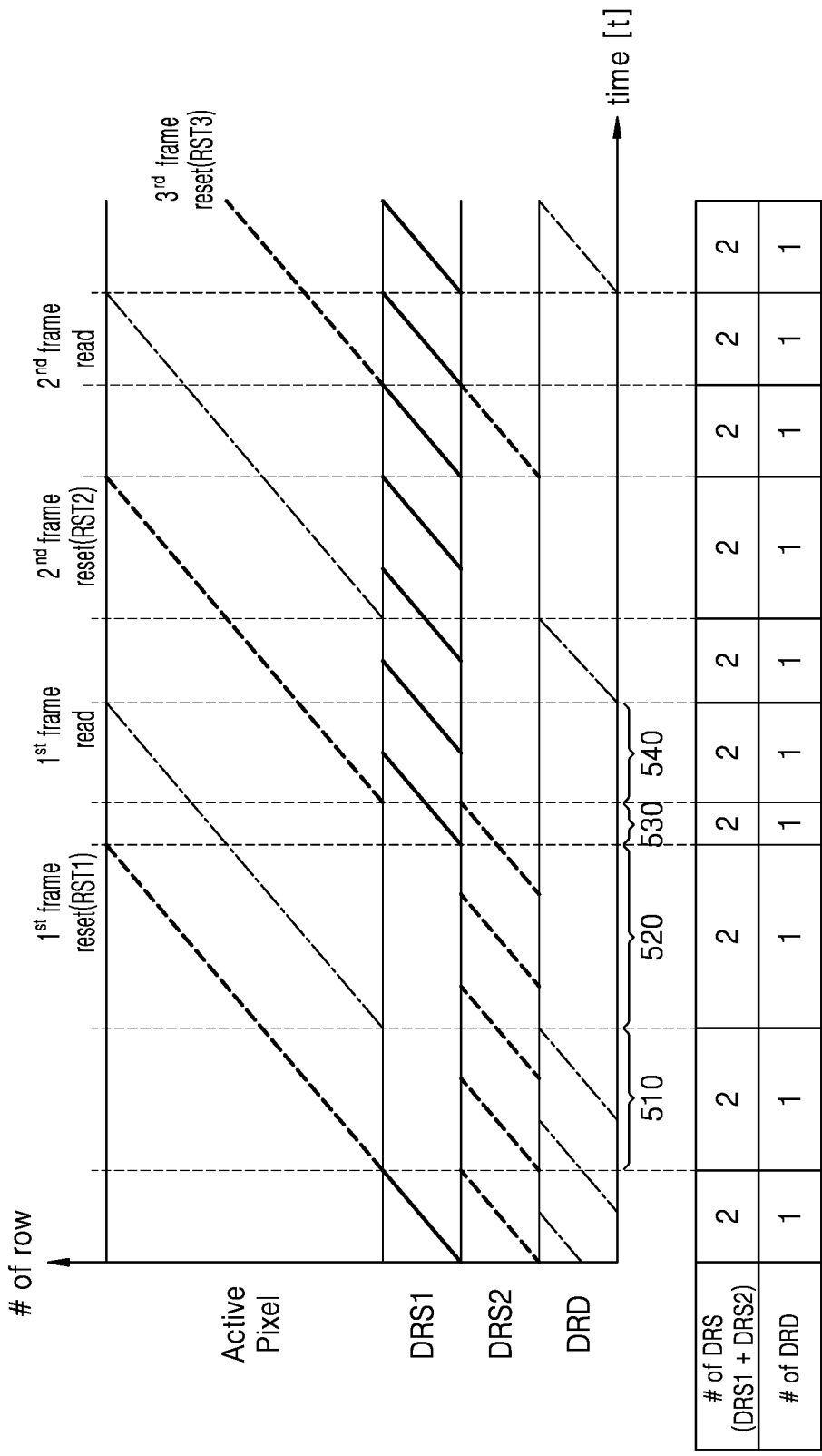
FIG. 5B illustrates an example of a case in which a size of a dummy reset array is changed according to an example embodiment of the disclosure.

FIG. 5B illustrates another example of a case in which a plurality of dummy reset arrays are used according to an example embodiment of the disclosure. Description previously made with reference to FIG. 5A will not be repeated.

Referring to FIG. 5B, in a period 550, the active pixel array may sequentially perform the reset operation in each row. The reset operation may be performed for the first frame. In order to generate the same image quality as that of a period 560, the dummy read array may sequentially perform the read operation in each row, which is similar to an operation performed in the period 510 of FIG. 5A. Repetitive description will be omitted.

According to example embodiments, in the period 550, a second dummy reset array DRS2 may sequentially perform the reset operation in each row. In detail, in the period 550, together with the read operation and the reset operation performed by the active pixel array for the first frame, the second dummy reset array DRS2 may additionally perform the reset operation. In generating an image of the first frame, in an entire pixel array, one read operation and two reset operations may be performed in different rows. One of the two reset operations may be the reset operation performed by the active pixel array for the first frame and the other one of the two reset operations may be the reset operation performed by the second dummy reset array DRS2. The dummy reset array set to operate to correspond to the first frame is illustrated based on the second dummy reset array DRS2. However, the disclosure is not limited thereto. According to example embodiments, the first dummy reset array DRS1 may be set to operate to correspond to the first frame.

In a period 570, the active pixel array may perform only the read operation. That is, the period 570 may correspond to the reset blank period and the read operation may be sequentially performed for the first frame in the period 570. In the period 570, if the dummy reset array is not activated, quality of an image for the first frame, which is generated in the period 570, may be different from the image quality corresponding to the periods 550 and 560. This is because, while the image quality corresponding to the periods 550 and 560 is based on a difference between coupling coefficients caused by the one read operation and the two reset operations through the entire pixel array, if the dummy reset arrays do not operate in the period 570, the image quality corresponding to the period 570 is determined in accordance with the coupling coefficient caused by one read operation. To prevent this problem and provide uniform image quality, each row of the dummy reset array may be sequentially activated in the period 570 and both the first dummy reset array DRS1 and the second dummy reset array DRS2 may be activated. In this manner, both the first dummy reset array and the second dummy reset array sequentially perform the reset operation and the image quality may be the same as that of the period 560.

In the above-described example embodiment, it is illustrated that the number of dummy reset arrays is two. However, the disclosure is not limited thereto. As described above, the number of dummy reset arrays may correspond to a multiple of a minimum unit of rows in which the same coupling coefficient is repeated. For example, as illustrated in FIG. 2B, when the coupling coefficient is repeated every four rows, the number of dummy reset arrays may be 4, 8, 12, . . . , or 4n. Also, when the active pixel array simultaneously resets a plurality of rows, a number of the plurality of rows that are simultaneously reset corresponds to a number of the dummy reset arrays that perform the reset operation in the reset blank period.

Figure 6:
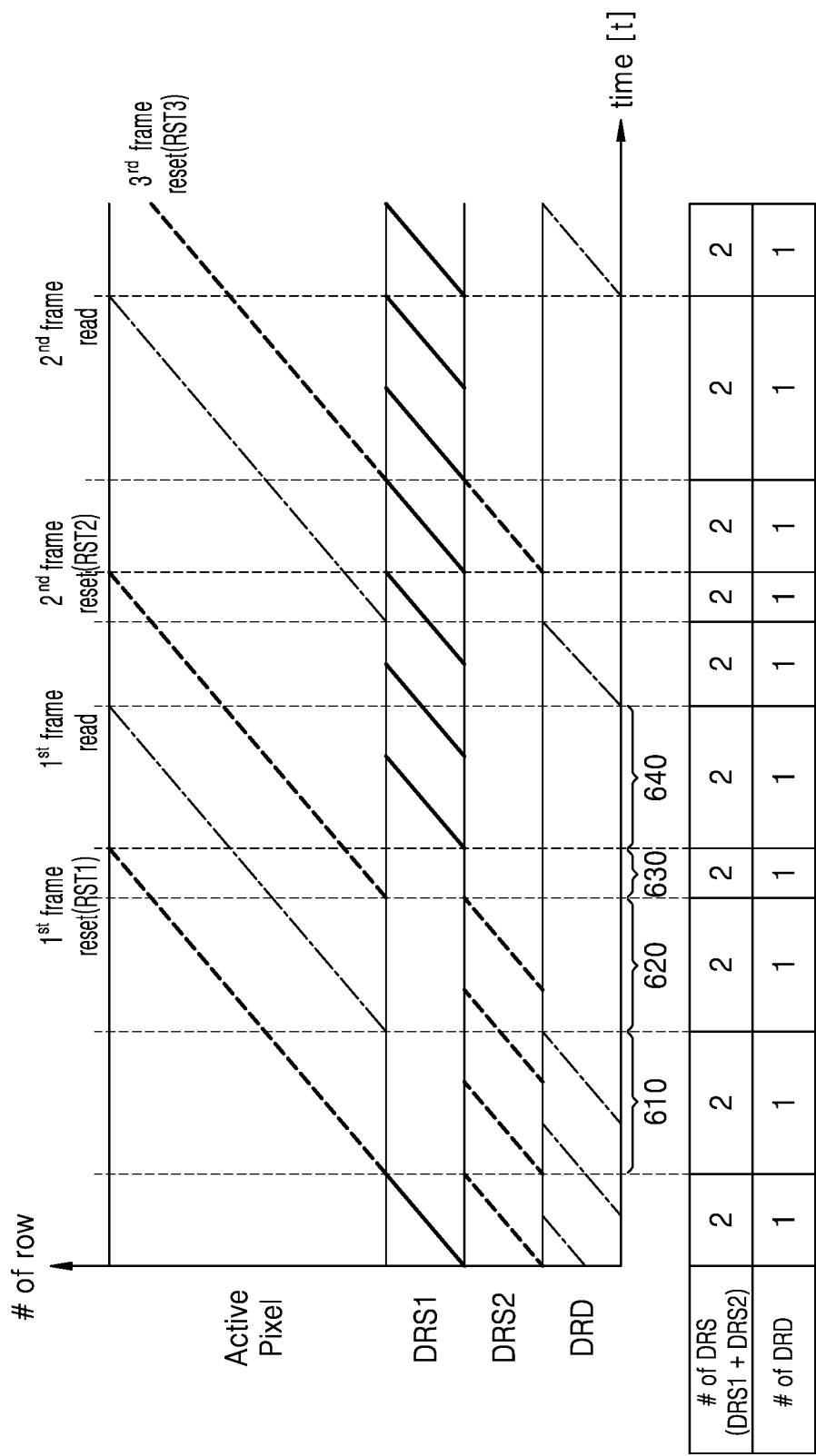
FIG. 6 illustrates an example of a case in which a plurality of reset operations are performed according to an example embodiment of the disclosure.

FIG. 6 illustrates an example of a case in which a plurality of reset operations are performed according to an example embodiment of the disclosure.

Referring to FIG. 6, in a period 610, the active pixel array may perform the reset operation for the first frame. Since only the reset operation is performed in the period 610, the dummy read array may sequentially perform the read operation. As described above in FIG. 5B, in the entire pixel array, the one read operation and the two reset operations may be performed. The two reset operations for the first frame may include the reset operation performed in the active pixel array and the reset operation performed in the second dummy reset array.

In a period 620, in the active pixel array, the read operation and the reset operation for the first frame may be performed, which is similar to an operation performed in the period 560 of FIG. 5B. Repetitive description will be omitted.

In a period 630, the active pixel array may perform one read operation and two reset operations at the same point in time. According to an example embodiment, when an electronic device including the pixel array 100 moves to a dark environment, integration time may increase in the second frame that is processed after the electronic device moves to the dark environment. Since a point in time at which the reset operation for the second frame is performed is advanced in accordance with an increase of the integration time for the second frame, the reset operation for the second frame may be performed before the read operation for the first frame and the reset operation for the first frame are completed. That is, the read operation and the reset operation for the first frame and the reset operation for the second frame may be performed at the same point in time in the active pixel array. In this case, since the one read operation and the two reset operations are performed in the active pixel array of the pixel array, the dummy array may not operate. If the dummy array operates in the period 630, the number of read operations and reset operations performed in the period 630 becomes different from those of the periods 610, 620, and 640 and accordingly, the image quality of the first frame may not be uniform.

Figure 7:
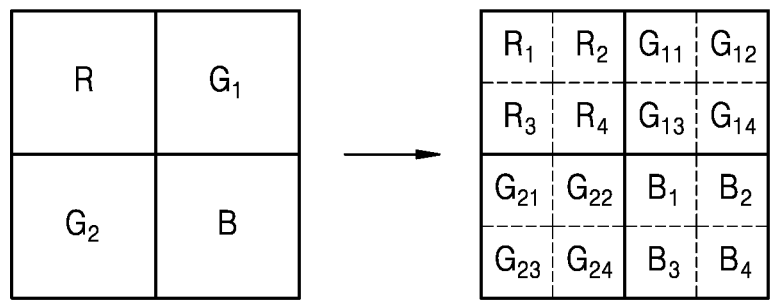
FIG. 7 illustrates patterns of a color filter, which are arranged in a pixel array, according to an example embodiment of the disclosure.

FIG. 7 illustrates patterns of a color filter, which are arranged in a pixel array, according to an example embodiment of the disclosure.

Referring to FIG. 7, a pixel array of a Bayer pattern and a pixel array of a quad Bayer pattern are illustrated. According to example embodiments, the pixel array of the Bayer pattern may include an R pixel, a $G_1$ pixel, a $G_2$ pixel, and a B pixel. In the pixel array of the quad Bayer pattern, each of the pixels of the Bayer pattern may be divided into four sub-pixels. For example, the R pixel of the Bayer pattern may be divided into four sub-pixels $R_1$, $R_2$, $R_3$, and $R_4$. According to example embodiments, in the quad Bayer pattern, pixels of the same color may share the FD node. For example, a photo-sensing device and transmission transistors corresponding to the sub-pixels $R_1$ to $R_4$ may be connected to the common FD node.

In the above-described example embodiment, examples of the Bayer pattern and the quad Bayer pattern are illustrated. However, the disclosure is not limited thereto and other pattern of the pixel array may be used. In another example embodiment, the pixel array of the Bayer pattern divided into nine sub-pixels may be used. For example, the R pixel of the Bayer pattern may be divided into nine pixels $R_1$ to $R_9$.

Figure 8:
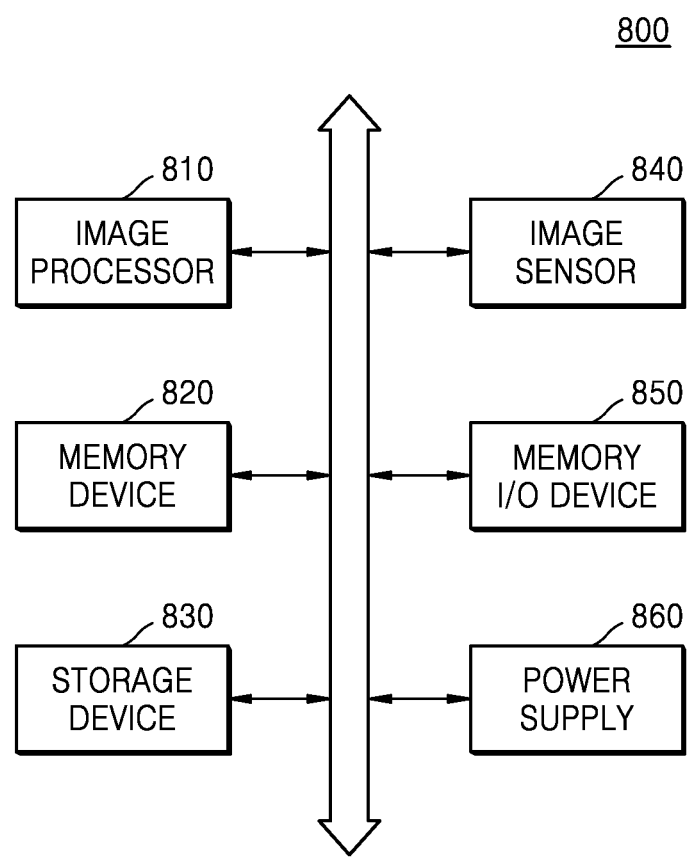
FIG. 8 is a block diagram illustrating a computing system including an image sensor according to an example embodiment of the disclosure.

FIG. 8 is a block diagram illustrating a computing system 800 including an image sensor according to an example embodiment of the disclosure.

Referring to FIG. 8, the computing system 800 may include an image processor 810, a memory device 820, a storage device 830, an image sensor 840, an input and output device 850, and a power supply 860. The image sensor 840 may include a pixel array according to an example embodiment of the disclosure. Although not shown in FIG. 8, the computing system 800 may further include ports that may communicate with a video card, a sound card, a memory card, and a universal serial bus (USB) device, or other electronic devices.

The image processor 810 may perform particular calculations or tasks. For example, the image processor 810 may include a micro-processor or a central processing unit (CPU). The image processor 810 may communicate with the memory device 820, the storage device 830, and the input and output device 850 through an address bus, a control bus, and a data bus. For example, the image processor 810 may be connected to an expansion bus such as a peripheral component interconnect (PCI) bus. When a digital zoom instruction is received from a host, the image processor 810 may output zoom information in accordance with the digital zoom instruction to the image sensor 840 through a bus.

The memory device 820 may store data required for an operation of the computing system 800. For example, the memory device 820 may include dynamic random access memory (DRAM), mobile DRAM, static RAM (SRAM), or a non-volatile memory device. Chips of the memories may be respectively or together mounted by using various forms of packages. For example, the chip may be packaged as a package such as a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), or a plastic metric quad flat pack (MQFP).

The storage device 830 may include a solid state drive (SSD), a hard disk drive (HDD), and compact disc-read only memory (CD-ROM). The input and output device 850 may include input units such as a keyboard, a keypad, and a mouse and output units such as a printer and a display. The power supply 860 may supply an operation voltage required for an operation of the computing system 800.

The image sensor 840 may be connected to the image processor 810 through buses or another communication link and may perform communication. According to embodiments of the disclosure, the image sensor 840 may prevent image quality from deteriorating in each row and remove band noise that may be caused by the dummy reset array or the dummy read array that performs a rolling shutter operation. The image sensor 840 may be integrated with one chip together with the image processor 810 or may be integrated in a different chip from the image processor 810. On the other hand, the computing system 800 should be understood as including all possible computing systems that use the image sensor 840. For example, the computing system 800 may include a digital camera, a mobile telephone, a personal digital assistant (PDA), a portable multimedia player (PMP), a smart phone, and a tablet personal computer (PC).

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

Although a few example embodiments have been shown and described, it would be appreciated by those skilled in the art that changes may be made in example embodiments without departing from the principles and spirit of the disclosure, the scope of which is defined in the claims and their equivalents.

What is claimed is:
1. An image sensor, comprising:
   an active pixel array including a plurality of active rows, each active row comprising a plurality of pixels;
   a dummy pixel array including a plurality of dummy rows, each dummy row having a plurality of pixels;

a row driver configured to drive the active pixel array and the dummy pixel array; and a timing generator configured to generate a control signal for controlling a rolling shutter operation of the row driver, wherein each pixel of the plurality of pixels in the active pixel array or the dummy pixel array comprises at least two photo-sensing devices, at least two transmission transistors and a floating diffusion node connected to the at least two transmission transistors, and wherein the rolling shutter operation includes a first period in which respective rows, included in a first part of the plurality of active rows, are sequentially reset while simultaneously respective rows, included in a first part of the plurality of dummy rows, are sequentially read.

2. The image sensor of claim 1,
wherein the rolling shutter operation includes a second period sequentially resetting a second part and a third part of the plurality of active rows and sequentially reading the first part and the second part of the plurality of active rows.

3. The image sensor of claim 2,
wherein the rolling shutter operation includes a third period sequentially reading the third part of the plurality of active rows and sequentially resetting a second part of the plurality of dummy rows.

4. The image sensor of claim 3,
wherein each frame includes the first period, the second period and the third period, chronologically.

5. The image sensor of claim 3,
wherein the first part and the second part of the plurality of dummy rows are different rows.

6. The image sensor of claim 3,
wherein the first part of the plurality of dummy rows are arranged in an upper area of the active pixel array, and
wherein the second part of the plurality of dummy rows are arranged in an lower area of the active pixel array.

7. The image sensor of claim 1,
wherein the at least two photo-sensing devices comprises a first photo-sensing device and a second photo-sensing device,
wherein the at least two transmission transistors comprises a first transmission transistor and a second transmission transistor, and
wherein a reset operation or a read operation of the plurality of dummy rows comprises activation of the first transmission transistor and the second transmission transistor in turn.

8. The image sensor of claim 7,
wherein a number of the plurality of dummy rows are 2n (n is an positive integer).

9. The image sensor of claim 1,
wherein the at least two photo-sensing devices comprises a first photo-sensing device, a second photo-sensing device, a third photo-sensing device and a fourth photo-sensing device,
wherein the at least two transmission transistors comprises a first transmission transistor, a second transmission transistor, a third transmission transistor and a fourth transmission transistor, and
wherein a reset operation or a read operation of the plurality of dummy rows comprises activation of the first transmission transistor, the second transmission transistor, the third transmission transistor and the fourth transmission transistor in turn.

10. The image sensor of claim 9,
wherein a number of the plurality of dummy rows are 4n (n is an positive integer).

11. The image sensor of claim 9,
wherein the first photo-sensing device, the second photo-sensing device, the third photo-sensing device and the fourth photo-sensing device are corresponding to a same color, and
wherein the first photo-sensing device, the second photo-sensing device, the third photo-sensing device and the fourth photo-sensing device constitutes a quad Bayer pattern.

12. An image sensor, comprising:
an active pixel array including a plurality of active rows, each active row comprising a plurality of pixels;
a dummy pixel array including a plurality of dummy rows, each dummy row having a plurality of pixels;
a row driver configured to drive the active pixel array and the dummy pixel array; and
a timing generator configured to generate a control signal for controlling a rolling shutter operation of the row driver,
wherein each pixel of the plurality of pixels in the active pixel array or the dummy pixel array comprises at least two photo-sensing devices, at least two transmission transistors and a floating diffusion node connected to the at least two transmission transistors, and
wherein the rolling shutter operation includes a first period sequentially resetting a first part of the plurality of active rows, sequentially reading a first part of the plurality of dummy rows, and sequentially resetting a second part of the plurality of dummy rows.

13. The image sensor of claim 12,
wherein the rolling shutter operation includes a second period sequentially resetting a second part, a third part and a fourth part of the plurality of active rows, sequentially reading the first part and the second part of the plurality of active rows and sequentially resetting the second part of the plurality of dummy rows.

14. The image sensor of claim 13,
wherein the rolling shutter operation includes a third period sequentially reading the third part of the plurality of active rows and sequentially resetting the second part and a third part of the plurality of dummy rows.

15. The image sensor of claim 14,
wherein the rolling shutter operation includes a fourth period sequentially reading the fourth part of the plurality of active rows, sequentially resetting the first part of the plurality of active rows and sequentially resetting the third part of the plurality of dummy rows.

16. The image sensor of claim 15,
wherein a first frame includes the first period, the second period, the third period and the fourth period, chronologically,
wherein a second frame overlaps the fourth period of the first frame.

17. An image sensor, comprising:
an active pixel array including a plurality of active rows, each active row comprising a plurality of pixels;
a dummy pixel array including a plurality of dummy rows, each dummy row having a plurality of pixels;
a row driver configured to drive the active pixel array and the dummy pixel array; and
a timing generator configured to generate a control signal for controlling a rolling shutter operation of the row driver,
wherein each pixel of the plurality of pixels in the active pixel array or the dummy pixel array comprises at least two photo-sensing devices, at least two transmission transistors and a floating diffusion node connected to the at least two transmission transistors, and wherein the rolling shutter operation includes a first period sequentially resetting a first part of the plurality of active rows, sequentially reading a first part of the plurality of dummy rows, and sequentially resetting a second part of the plurality of dummy rows, and wherein the rolling shutter operation includes a second period sequentially resetting a second part and a third part of the plurality of active rows, sequentially reading the first part of the plurality of active rows and sequentially resetting the second part of the plurality of dummy rows.

18. The image sensor of claim 17, wherein the rolling shutter operation includes a third period sequentially resetting a fourth part of the plurality of active rows, sequentially reading the second part of the plurality of active rows and sequentially resetting the first part of the plurality of active rows.

19. The image sensor of claim 18, wherein the rolling shutter operation includes a fourth period sequentially reading the third part and the fourth part of the plurality of active rows, sequentially resetting the first part and the second part of the plurality of active rows and sequentially resetting a third part of the plurality of dummy rows.

20. The image sensor of claim 19, wherein a first frame includes the first period, the second period, the third period and the fourth period, chronologically, wherein a second frame overlaps the third period and the fourth period of the first frame.

* * * * *